(No Model.)

P. KOCH.
BEE CABINET.

No. 319,979. Patented June 16, 1885.

Witnesses.
John C Perkins
John H. Chase

Inventor.
Peter Koch
By Lucius C. West
Atty.

UNITED STATES PATENT OFFICE.

PETER KOCH, OF PARKVILLE, MICHIGAN.

BEE-CABINET.

SPECIFICATION forming part of Letters Patent No. 319,979, dated June 16, 1885.

Application filed November 18, 1884. (No model.)

*To all whom it may concern:*

Be it known that I, PETER KOCH, a citizen of the United States, residing at Parkville, county of St. Joseph, State of Michigan, have invented a new and useful Bee-Cabinet, of which the following it a specification.

This invention has for its object certain improvements intended to insure greater comfort and safety to the bees and to facilitate the care of them.

Figure 1:
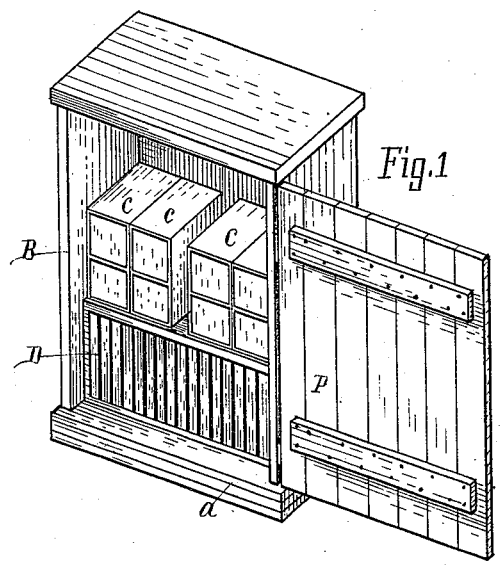
Figure 2:
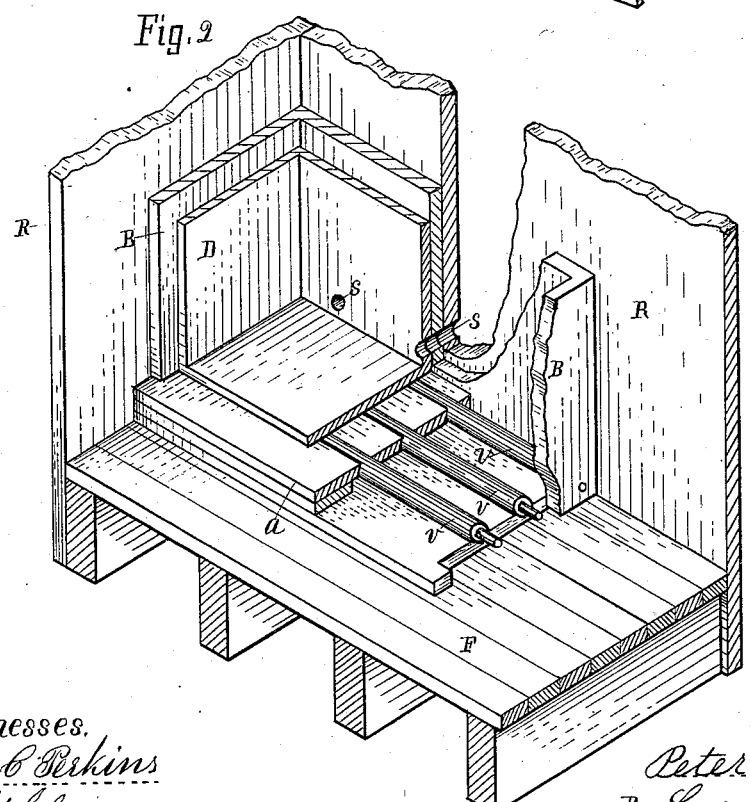

In the drawings forming a part of this specification, Figure 1 is a perspective view of a bee-hive, the door being open, disclosing internal contents; and Fig. 2 is a broken portion of a bee-house and a broken portion of the hive and contents, all in perspective, enlarged, and more fully described below.

The hive B is made in the common rectangular form, having top, bottom, rear, and side inclosures, with a door, P, in front. The brooding-chamber D is detachably placed in the hive B, with its rear wall closely in contact with the rear wall of the said hive, Fig. 2.

R represents the wall of a bee-house, into which the hive, with its contents, is placed, with the rear wall of the hive closely in contact with the wall of the bee-house.

An opening, S, (one or more,) leads from the brooding-chamber D, through the rear wall thereof, through the rear wall of the hive, and thence through the wall R of the bee-house, out into the open air, through which the bees pass in going outdoors and in returning to the brooding-chamber.

F is the floor of the bee-house. The honey-boxes $c\ c$ are placed on the brooding-chamber, and passages lead from the latter into said boxes $c\ c$ in the usual manner.

The bees are thus kept proof against freezing, theft, or other harm the year round, and the bees have ready and free access to the outside air and blossoming fields at will.

To facilitate moving the brooding-chamber in and out of the hive and to provide for a circulation of air beneath the brooding-chamber, I provide the hive with rollers $v\ v$, buried in the floor, which serve the double purpose of rollers and foundation-supports, which keep the chamber a little above the floor of the hive. These rollers have bearings at each end in the side walls of the bee-hive B, as in Fig. 2, the right-hand ends of the rollers being here shown by portions of the bee-hive being broken away. The periphery of the rollers extends a little above the upper side of the floor $a$.

Having thus described my invention, what I claim, and desire to secure by Letters Patent, is—

The combination of the brooding-chamber, the hive, and the rollers buried in the floor of the hive, extending a little above the surface of the floor and having end bearings in the side walls of the hive, for the objects set forth.

In testimony of the foregoing I have hereunto subscribed my name in presence of two witnesses.

PETER KOCH.

Witnesses:
 JOS. A. FRANKLIN,
 A. CAMERON.